UNITED STATES PATENT OFFICE.

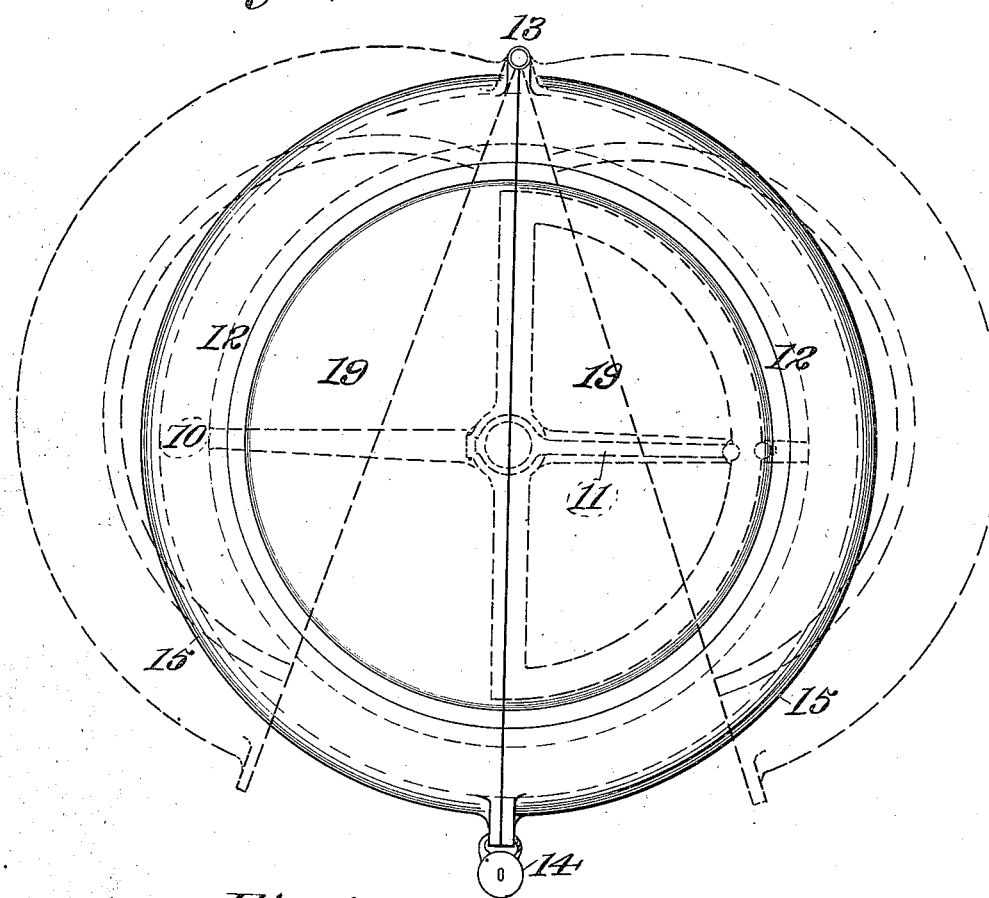

THOMAS E. FOGALSANG, OF SAN FRANCISCO, CALIFORNIA.

PROTECTIVE DEVICE FOR STEERING-WHEELS.

1,154,389.  Specification of Letters Patent.  Patented Sept. 21, 1915.

Application filed May 12, 1915. Serial No. 27,656.

*To all whom it may concern:*

Be it known that I, THOMAS E. FOGAL-SANG, a citizen of the United States, residing in the city and county of San Francisco and State of California, have invented new and useful Improvements in Protective Devices for Steering-Wheels, of which the following is a specification.

This invention relates to protective devices for automobiles, and has for its object to provide a simple, inexpensive and easily operable means which will prevent the unauthorized running of an automobile.

In carrying out my invention, I employ a guard or protective covering to fit over the steering wheel of an automobile in such a manner as to prevent access to the wheel or other control parts, and adapted to be locked in position thereon so as to rotate freely.

In producing my invention I have taken advantage of the fact that automobiles when left unguarded are usually located in garages or against the street curb, necessitating in this way immediate use of the steering wheel to get them into the straightaway thoroughfare. This universal condition enabled me to make use of an exceedingly simple arrangement which would be effective for the purpose intended and still not of such a severe nature as to do harm to the mechanism to which it is applied, such as would occur if a positive lock were employed and the miscreant attempted to force the wheel against it. Also the means I employ offer a protection for the control levers so that it becomes difficult for one even to start the engine when the guard is in place.

A preferred and modified form of my invention are exemplified in the following description and illustrated in the accompanying drawing, in which—

Figure 1 shows a vertical, central cross section of the preferred form of my device applied to the steering wheel of an automobile. Fig. 2 shows a plan view of the same, the dotted lines illustrating its open position. Fig. 3 shows a view similar to Fig. 1, the device being slightly modified in this instance.

Referring now in detail to the drawings, there is shown a steering wheel 10, provided with the usual control levers 11, and encompassing the wheel is a guard or covering 12 formed in two semicircular sections hinged together at 13 and provided with a locking device at 14. Each section has a trough-shaped annulus 15 of greater width and diameter than the rim of the steering wheel so that the guard is free to turn independently thereon when in locked position. The top and bottom sides 16 of the guard project inwardly to cover the spokes 17 of the wheel. The guard is constructed of rigid material, preferably some sort of metal, and a lining 18 of felt, canvas, or other soft material is provided on the interior thereof to prevent marring of the wheel.

Obviously, the guard, because of its hinged sections, can easily be applied to a wheel, and, in operation, it so incloses and protects the latter that it would be impossible or difficult for one to secure a grip whereby to steer the automobile. The guard will, itself, turn freely, when in operative position, but on account of its loose fit and its rigid walls it cannot be made to engage the wheel with sufficient friction to turn the latter. Owing to the manner in which I construct the guard and the way in which it operates, it is apparent that the same can be applied to steering wheels of varying sizes and diameters and this without in any way adjusting the guard.

The form of this device which I prefer to employ is shown in Fig. 1 and has a central covering plate 19 on its top portion which, in addition to inclosing the control levers, renders it impossible to so connect, by means of tape or cord, the rim of the guard with the hub of the wheel as to turn the latter through the former. Moreover, such a covering serves to protect the wheel from the weather and adds also to the appearance of the device.

It is recognized that for ordinary conditions the guard may be constructed, as shown in Fig. 3, without the central covering, it being only necessary to make it inconvenient for one to operate or steer the automobile to insure reasonable security.

Many changes in the construction and arrangement of the several parts of the device may be resorted to without departing from the spirit of my invention as disclosed in the appended claim.

Having thus described my invention, what I claim and desire to secure by Letters Patent is—

A protective device for the steering wheels of automobiles including a pair of hingedly connected guard members formed with portions adapted to loosely receive the steering wheel rim, packing lining the interior of said portions to engage the top, bottom and periphery of the steering wheel rim so as to support the device entirely from the steering wheel rim and to maintain same otherwise out of contact with the steering wheel and to also permit the device to freely rotate about said wheel without turning the latter, and means to lock the members together.

In testimony whereof I have hereunto set my hand in the presence of two subscribing witnesses.

THOMAS E. FOGALSANG.

Witnesses:
R. H. CHAPMAN,
E. B. PRICE.